Jan. 25, 1938.  R. E. McGEE  2,106,304
ACTUATING MECHANISM FOR HYDRAULIC BRAKES
Filed Sept. 3, 1935
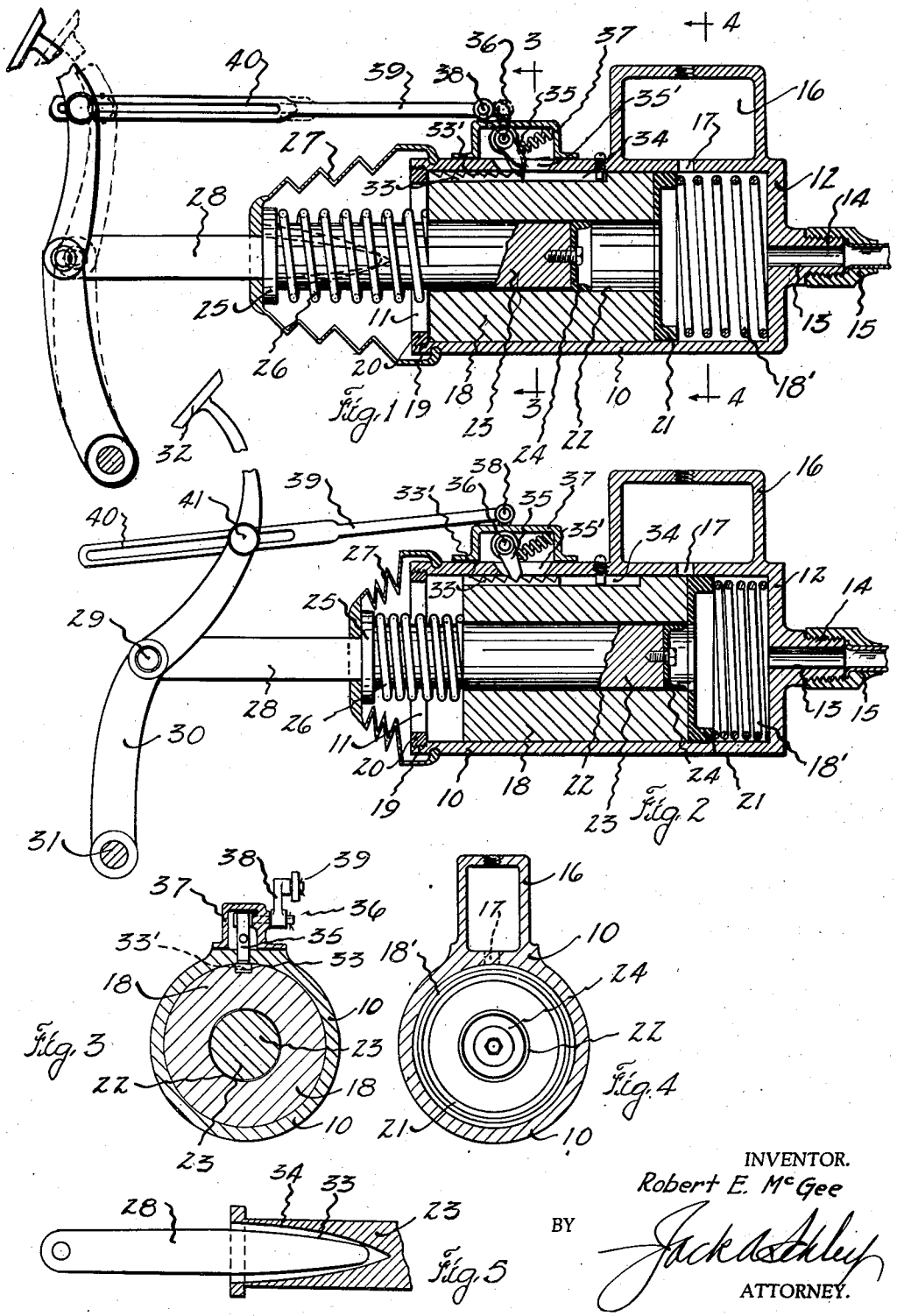
INVENTOR.
Robert E. McGee
BY
Jack A. Ashley
ATTORNEY.

Patented Jan. 25, 1938

2,106,304

UNITED STATES PATENT OFFICE 2,106,304

ACTUATING MECHANISM FOR HYDRAULIC BRAKES

Robert E. McGee, Beeville, Tex.

Application September 3, 1935, Serial No. 38,912

3 Claims. (Cl. 60—54.6)

This invention relates to new and useful improvements in actuating mechanisms for hydraulic brakes.

One object of the invention is to provide an improved actuating mechanism, which is particularly adapted to be applied to the brake pedal of a motor vehicle for operating the hydraulic brakes of said vehicle.

An important object of the invention is to provide an improved actuating mechanism for fluid-actuated brakes, which is so arranged that upon initial operation of said mechanism, a low pressure is applied to the brake shoes to move them into engagement with the brake drums, and a high pressure is applied for the actual braking operation, whereby the shoes move slowly into engagement with the drums and then grip the same after such engagement, which eliminates sudden gripping of the lining of shoes with the drums, thereby reducing wear.

Another object of the invention is to provide an improved actuating mechanism for hydraulic brakes which includes a double piston, one larger than the other, the piston being so arranged that upon initial actuation of the mechanism, the large piston is moved to displace a greater amount of fluid under a low pressure which rapidly moves the brake shoes from their unoperated position into braking engagement with the brake drums, the smaller piston then coming into action to displace less fluid under a high pressure to actually perform the braking, the double piston permitting an easy transition of braking power and an easy approach of the shoes to the surface of the drums, whereby smoother and more rapid and efficient braking is had.

A still further object of the invention is to provide an improved actuating mechanism for hydraulic brakes arranged to be operated by the brake pedal of a motor vehicle and including, a large piston and a small piston which are so connected that the large piston completes its full stroke before the small piston moves to displace any fluid, there being means for retaining the large piston in its inward position at the end of its stroke until such time as the smaller piston completes its stroke, the release of the brake pedal serving to restore both pistons to their original positions.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in elevation and partly in section, of an actuating mechanism, constructed in accordance with the invention, Figure 2 is a similar view showing the pistons of the mechanism in their inward positions, Figure 3 is a transverse, vertical, sectional view, taken on the line 3—3 of Figure 1, Figure 4 is a transverse, vertical, sectional view, taken on the line 4—4 of Figure 1, and Figure 5 is an enlarged, sectional detail showing the engagement of the operating lever with the pistons.

In the drawing the numeral 10 designates an elongated cylinder which has one end 11 open. The other end of the cylinder is closed by an end wall 12 which has an axial opening 13 located therein. Surrounding the opening 13 and extending outwardly from the end wall 12 is a threaded nipple 14 which is preferably made integral with said end wall. This nipple has one end of a suitable conduit 15 connected therewith. The other end of the conduit connects with the usual cylinder which operates the brake shoes of the braking mechanism on each wheel of a motor vehicle (not shown).

A reservoir 16 is preferably made integral with the cylinder 10 and is disposed at one end thereof. The reservoir is preferably rectangular in cross-section and the interior of said reservoir communicates with the interior of the cylinder through a port 17 (Figures 1 and 2). This reservoir is arranged to receive the hydraulic brake fluid which is utilized to actuate the brake shoes in the usual way. It is obvious that the fluid within the reservoir will flow through the port 17 into the interior of the cylinder and may then escape from said cylinder through the opening 13 and into the conduit 15 which then carries it to the braking mechanism of each wheel of the vehicle. It is noted that since the reservoir 16 is located at one end of the cylinder 10 that the fluid within said reservoir will flow into that end of said cylinder.

For forcing the fluid which has entered the cylinder 10 from the reservoir 16 into the actuating cylinder (not shown) of the braking mechanism, an enlarged piston 18 has a close sliding fit within the cylinder 10. This piston has a length which is substantially two-thirds of the length of said cylinder, although the particular size of the piston may vary. The open end of the cylinder 10 is threaded at 19 to receive a retaining ring 20, and it will be seen that after the piston 18 has been entered into the cylinder 10 and the ring 20 screwed into place, said ring will serve to prevent displacement of said piston from said cylinder. The piston is provided at its inner end with the usual cylindrical packing cup 21, which may be composed of rubber, leather, or any other suitable material. It will be obvious that when the large piston 18 moves to the right in Figure 1, that the fluid within the end of the cylinder 10 will be forced into the conduit and to the braking mechanism of each wheel.

The enlarged piston 18 which is slidable within the cylinder, is provided with an axial opening 22 which extends throughout the entire length of said piston. A reduced or smaller piston 23 has a close sliding fit within this axial opening and this piston is provided with the usual packing cup 24 at its inner end. The outer end of the smaller piston 23 projects from the end of the opening 22 and is provided with an enlarged collar 25 at its outer end. Confined between the collar 25 and the end of the enlarged piston 18 is a coil spring 26 which surrounds the inner or smaller piston 23. This spring constantly exerts its pressure to hold the smaller piston 23 in an outward position, as clearly shown in Figure 1. The extended end of the inner piston 23 may be suitably covered by a flexible dust cover 27 which may be made readily removable.

For moving the pistons 18 and 23 inwardly to expel the hydraulic fluid within the end of the cylinder 10, an elongated actuating push rod 28 is provided. This push rod has one end pivoted at 29 to the brake pedal actuating lever 30. The lower end of brake lever is, of course, pivoted at 31 while the upper end of said lever is formed with the usual brake pedal 32. The actuating push rod 28, which has one end pivoted to the brake pedal lever 30 has its other end tapered at 33 (Figure 5), and this tapered end extends into a tapered opening 34 formed within the outer end of the smaller piston 23. It is noted that the opening 34 is disposed axially within the end of the piston 23 and this opening is of such diameter that the tapered end 33 of the push rod 28 may undergo a limited transverse movement therein. It is further pointed out that there is no fastening between said push rod and the piston 23.

In operation, with the hydraulic fluid within the reservoir 16, it will be obvious that said fluid will flow into the end of the cylinder 10 between the end wall 12 of said cylinder and the inner end of the enlarged piston 18. The piston 18 is held in the position shown in Figure 1 by a coil spring 18' which is confined within this end of the cylinder between the inner end of said piston and the end wall 12. This spring constantly exerts its pressure to hold the piston outwardly away from said end wall. The fluid from the reservoir 16 will not only enter the cylinder 10 but will also flow into the axial opening 22 and into the conduit 15. It is noted that while the spring 18' holds the enlarged piston 18 away from the end wall 12, the coil spring 26 holds the inner or smaller piston 23 in its outer position (Figure 1).

Upon depression of the foot pedal 32, it will be seen that the foot pedal lever 30 will be swung inwardly or to the right in Figure 1. This swinging of the lever 30 will cause the actuating push rod 28 to move inwardly toward the cylinder 10. When the push rod 28 undergoes such movement, it will be obvious that its inner tapered end, engaging in the tapered opening 34 will exert a pressure against the smaller piston 23 to tend to move said piston inwardly within the axial opening 22. The coil spring 26 which is considerably smaller but stronger than the coil spring 18' which is resisting the movement of the large piston 18, causes the pressure which is exerted by the push rod 28 against the smaller piston 23 to be transmitted through this smaller coil spring 26 to the large piston 18, whereby, upon actuation of the foot pedal 32, the push rod 28 will cause an inward movement of the large piston 18. In other words, the spring 26 serves to lock the larger and smaller pistons 18 and 23 respectively together whereby a pressure exerted by the push rod 28 will move the parts simultaneously toward the end wall 12 of the cylinder 10. Such movement will, of course, cause compression of the spring 18' and at the same time will force fluid from the end of the cylinder 10 through the conduit and to the braking mechanism of each wheel of the vehicle. Since the cross-sectional area of the large piston 18 is comparatively large, it will be seen that a comparatively large amount of fluid will be displaced from the cylinder 10 to the braking mechanism of each wheel upon the initial actuation of the brake pedal 32. Also, because of the large cross-sectional area of the piston 18 this large displacement of fluid is under a comparatively low pressure. It is this initial low pressure displacement which causes the brake shoes (not shown) of each wheel to move into engagement with the brake drum (not shown) thereof. Thus it will be seen that to move the brake shoes from their inoperative position into engagement with the brake drum, the fluid is carried to the braking mechanism under a low pressure. The large displacement provides for a comparatively rapid movement of the shoes to this position.

By the time that the brake shoes have engaged the brake drum and are ready for the braking operation, the large piston 18 has moved its entire distance or completed its stroke, which distance or length of stroke obviously depends on the amount of normal clearance between the brake bands and drums. At this time further movement of the piston 18 is prevented and continued actuation of the brake pedal 32 will cause the inner or smaller piston 23 to begin to move inwardly within the axial opening 22 in the large piston under tension of the coil spring 26.

To hold the large piston 18 in its inner position or at the end of its stroke, a ratchet bar 33 is secured in a longitudinal slot 34 formed in the upper wall of the piston 18. The teeth 33' of this ratchet bar are arranged to be engaged by a spring pressed pawl 35 which is secured on a rotatable shaft 36 which is mounted in a suitable housing 37 fastened on the upper end of the cylinder 10. The lower end of the pawl 35 extends through a slot 35' in the cylinder wall, whereby it may engage the teeth 33' of said ratchet bar. One end of the shaft 36 on which said pawl is fastened extends outwardly from one side of the casing 37 and has an upwardly extending arm 38 fastened thereto. The upper end of this arm is pivoted to one end of a release bar 39 which extends horizontally above the actuating push rod 28. The other end of the bar 39 is provided with an elongated slot 40 through which a pin 41 secured on the brake pedal lever 30 extends. With the brake pedal in its released position the pin 41 engages the end of the slot to pull the bar 39 in the direction of the arrow Figure 1, which swings the arm 38. Swinging of the arm 38 rotates the shaft 36 on which the pawl 35 is mounted and it will be obvious that rotation of this pin will swing the pawl upwardly under tension of the spring thereof. Thus it will be seen that when the brake pedal is in its released position, the pawl 35 is swung above, or out of engagement with the ratchet teeth 33' of the ratchet bar 33. However, as soon as the pedal is depressed the pin 41 moves inwardly through the slot 40 in the release bar 39, which permits the spring of said pawl to immediately swing the pawl downwardly into engagement with the ratchet teeth 33'.

The provision of the ratchet and pawl permits the piston 18 to be held in its inward position after said piston has been moved to such position by the depression of the foot pedal 32. As above pointed out, the initial movement of the foot pedal lever 30 moves the large piston 18 under tension of the spring 18' to displace a comparatively large amount of fluid from the cylinder 10 through the conduit 15 and into the braking mechanism of each wheel. After the large piston has completed its stroke and can move no further due to the setting of the brakes, at which time there may be a complete compression of the spring 18', it will be obvious that the pawl engaging the tooth 33' on the ratchet will hold the large piston in such position.

Continued depression or movement of the foot pedal 32 will then cause the small piston 23 to begin to move lengthwise in the large piston 18 under tension of the spring 26 which now yields because the further movement of the large piston 18 has been positively stopped. It is noted that at the time that the large piston 18 completes its stroke sufficient fluid has been forced to the braking mechanism of each wheel of the motor vehicle to move the brake shoes (not shown) from their inoperative or disengaged position into engagement with the periphery of the brake drum (not shown). Thus it will be seen that when the piston 18 has completed its stroke the brake shoes are ready to begin the braking operation. At this time it is desirable that the fluid which is forced to the brake shoes should be under a high pressure so that an efficient braking will be had. At this time the small piston 23 begins to move inwardly within the axial opening 22 in the large piston and displaces the fluid which is behind said smaller piston forcing the same into the conduit 15 and to said brake shoe. Due to the comparatively small diameter of the piston 23 and the comparatively small cross-sectional area of the opening 22 it will be obvious that as the small piston moves inwardly within the opening that the fluid forced to the brake shoes will be under a comparatively high pressure. It is noted that the displacement of fluid is not so great but since the shoes have already moved into engagement with the periphery of the brake drum (not shown) it is not necessary to displace a great amount of fluid. It is only desirable to force this fluid to the shoes under a high pressure to make for more efficient braking.

From the above it will be seen that upon initial movement of the brake pedal 32 that fluid is forced to the brake shoes of each wheel of the vehicle under a comparatively low pressure. At the beginning of the depression of said brake pedal, a comparativly large amount of fluid under a low pressure is displaced from the cylinder and forced to said shoes due to the enlarged cross-sectional area of the piston 18. This comparatively large displacement will permit the brake shoes to be normally adjusted a greater distance from the brake drum because such large displacement will cause the shoes to move a greater distance in a shorter length of time. By being able to locate the shoes a greater distance from the drum, there is no danger of said shoes dragging on the periphery of the drum. Also a fine adjustment of the shoes with relation to the drum is unnecessary. The large displacement of fluid under a low pressure will move the shoes into engagement with the periphery of the brake drum, but it is noted that although said shoes engage the drum no braking action is had because the fluid which has forced said shoes into such engagement is under a comparatively low pressure. The parts are so arranged that as soon as the shoes engage the periphery of the drum, the small piston 23 begins its inward movement whereby the fluid which is then forced to the shoes is under a comparatively high pressure whereby an efficient braking action is had.

After the inner piston has completed its stroke and the braking action has been completed a release of the pedal 32 will permit the brake pedal lever 30 to return to its normal or inoperative position. When this occurs the pin 41 which is located near the upper end of the brake pedal lever 30 engages the end of the slot 40 in the release bar 39. This engagement of the pin in the slot causes the release bar 39 to move in the direction of the arrow in Figure 1 which in turn swings the arm 38 to rotate the shaft 36 on which the pawl 35 is secured. Rotation of the shaft 36 will, as has been explained, swing the pawl 35 upwardly under tension of its spring and out of engagement with the teeth 33' of the ratchet bar 33. As soon as said pawl disengages the teeth it will be obvious that the spring 18' will immediately return the large piston 18 to its original position (Figure 1), and that spring 26 will return the small piston 23 to its original position. Therefore the parts are ready to be actuated again upon the release of the brake pedal. As soon as the pedal 32 is again depressed for the next braking operation, the pin 41 will, of course, move away from the end of the slot 40 which will permit the pawl 35 to again swing inwardly to engage the teeth 33' of the ratchet bar 33. It is noted that although the device has been shown and described as actuating the brake shoes of a braking mechanism for the wheels of a motor vehicle, said device may be applied to any suitable braking mechanism and the invention is not to be limited to the application to a motor vehicle.

What I claim and desire to secure by Letters Patent is:

1. An actuating mechanism for fluid-actuated brakes including, a cylinder having fluid therein and having connection with said brakes, a piston slidable in said cylinder and having an axial opening therethrough, a second piston slidable within the opening of the first piston, resilient means for connecting the pistons, whereby both pistons move as a unit until the first piston has completed its stroke at which time the second piston begins its movement, thereby first displacing a large amount of the fluid from the cylinder under a low pressure and then displacing a comparatively small amount of fluid under a high pressure, releasable latch means for retaining the first piston at the end of its stroke, and manually operated means including a lever member for moving the pistons and having a lost motion connection between said lever member and said releasable latch means whereby the latch means automatically engages said piston on the piston operating stroke of the lever member and is forcibly released from such engagement on the return stroke of the lever member.

2. An actuating mechanism for fluid-actuated brakes including, a cylinder having fluid therein and having connection with said brakes, a piston slidable in said cylinder and having an axial opening therethrough, a second piston slidable within the opening of the first piston, resilient means for resisting the operation of the first piston, a spring confined between the two pistons to normally hold the inner piston in its inoperative position, said spring having a greater strength than the resilient means, whereby the two pistons move as a single unit until the first piston has overcome the resilient resisting means and completed its stroke, at which time continued movement of the inner piston overcomes the spring tension and said piston moves inwardly, thereby first displacing a large amount of fluid from the cylinder under a low pressure due to the movement of the first piston and then displacing a comparatively small amount of fluid under a high pressure through the movement of the inner piston, automatic engaging means including a spring-pressed pawl for retaining the first piston at the end of its stroke, manually operated means including a lever member for moving the pistons, and means for connecting said manually operated means with the retaining means, whereby the first piston is released and returned to its original position when the manually operated means is returned to its normal inoperative position, said connecting means comprising a bar having a slot-and-pin attachment to said lever member and a lever connection with said spring-pressed pawl whereby said pawl is automatically engaged with said first piston on the piston operating stroke of said lever member but is released from such engagement on the return stroke of said lever member.

3. Actuating means for fluid-actuating brakes comprising, a fluid containing cylinder, a double-acting piston provided at its inner end for confining and pressing the fluid in said cylinder, said piston comprising an elongated cylindrical bodied outer low pressure member slidably fitted in the cylinder and having an axial bore therethrough, a cylindrical inner high pressure member slidably fitted in the bore of said outer member, said inner member extending beyond the outer end of said outer member and provided with a collar, a spring on said inner member interposed between said collar and the outer end of said outer member whereby to normally hold said inner member yieldably retracted with its inner end away from the inner end of said outer member, said spring being of sufficient strength whereby both piston members move forwardly together in their normal relation when operating power is applied to said inner member and until a resisting pressure sufficient to overcome the spring tension is created in the cylinder by displacement of a relatively large amount of fluid, and, thereafter, the spring yields to continued movement of the inner piston member alone, thereby additionally displacing a smaller amount of the fluid and creating a higher fluid pressure, a power element for operating said inner piston member, a ratchet bar disposed longitudinally on said outer piston member, a pawl on the cylinder engaging said ratchet bar to hold said outer piston member in its operated position, and a lost motion link and lever connection between said pawl and said power element whereby said pawl is free to automatically engage said ratchet bar during the operating movement of the piston member but is retracted and withheld from such engagement when said power element is restored to its normal inactive position.

ROBERT E. McGEE.